United States Patent [19]

Kleinschmidt, Jr.

[11] 4,399,397

[45] Aug. 16, 1983

[54] ELECTRONIC PHASE SHIFT AND SPEED GOVERNOR

[75] Inventor: Robert S. Kleinschmidt, Jr., Pittsfield, Me.

[73] Assignee: R. Stevens Kleinschmidt, Pittsfield, Me.; a part interest

[21] Appl. No.: 255,153

[22] Filed: Apr. 17, 1981

[51] Int. Cl.³ .......................... H02P 9/00; H02P 9/14
[52] U.S. Cl. .......................................... 322/8; 322/19; 322/20; 322/29
[58] Field of Search ...................... 322/7, 8, 19, 20, 22, 322/23, 27, 29, 32, 99, 100; 361/20, 21, 78

[56] References Cited

U.S. PATENT DOCUMENTS

| 3,215,935 | 11/1965 | Mead, Jr. et al. | 322/98 X |
| 3,546,533 | 12/1970 | Lydick | 361/20 |
| 3,855,519 | 12/1974 | Waldmann | 322/20 |
| 3,936,722 | 2/1976 | Goto et al. | 322/20 |
| 4,219,768 | 8/1980 | Gobaud | 322/32 X |
| 4,229,694 | 10/1980 | Wilson et al. | 361/20 X |

Primary Examiner—R. J. Hickey
Attorney, Agent, or Firm—W. G. Fasse; D. H. Kane, Jr.

[57] ABSTRACT

A digital electronic governor controls and stabilizes the electrical power output delivered to an output circuit by an AC alternator having a rotating shaft driven by a source. The governor provides a first relatively fast acting governing function operatively responsive to phase shift of the electrical power output relative to the rotating shaft corresponding to changes in load at the output circuit. The first governor stabilizes the phase shift of the electrical power output at a specified phase lag interval relative to the shaft rotation. The electronic governor also provides a second governing function operatively responsive to relatively slower inertial changes in the speed of rotation of the shaft, corresponding to changes in the power level of the AC alternator. This second governor stabilizes the rotating shaft at a specified speed of rotation, e.g., 60 cycles per second. The first governor generates load signals in response to the measured phase shift deviation from a standard phase lag interval. The electronic governor also includes a sequence of dump loads and switching means operatively responsive to the load signals for switching dump loads into and out of the output circuit for maintaining the desired standard phase lag interval. The second governor stabilizes speed of rotation of the alternator shaft by calculating and specifying the desired phase lag interval standard. The second governor therefore sets the standard for the first governor, and the first governor in turn controls the dump loads.

15 Claims, 7 Drawing Figures

ELECTRONIC PHASE SHIFT AND SPEED GOVERNOR

BACKGROUND OF THE INVENTION

This invention relates to a new electronic governor for controlling and stabilizing the electrical power output delivered to an output circuit by an AC alternator having a rotating shaft driven by a source. The invention is applicable for both variable and steady sources of power including diesel engines and small scale hydro. It provides fast response to short term fluctuations while at the same time providing long term stability and accuracy.

Conventional governors detect and respond to changes in speed or angular velocity of the alternator or generator drive shaft. A governor, which is based upon changes in speed or angular velocity derived from a shaft detector, can react only after there has been measurable inertial change in the mass of the rotating machinery. This flywheel effect produces a slow response time in conventional governors necessarily extending over many cycles of the rotating shaft.

Typical governors operate on mechanical principles for stabilizing the mechanical speed or angular velocity of the generator or alternator shaft. More recently, electronic load governors have been introduced, but such electronic governors are based upon detecting and maintaining constant system frequency. Because such governors are based on the frequency of the output, the response time is again limited. The frequency of the output reflects the speed of rotation or angular velocity of the shaft, and changes in frequency are detected only after the delay of inertial effects as mechanical changes take place in the shaft speed rotation.

Thus, J. L. Woodward and J. T. Boys describe a "Digital Electronic Load Governor For Small Hydro Plants" in the July, 1980, issue of *Water Power and Dam Construction*. The electronic controller described by Woodward and Boys uses the observed frequency at the terminals to maintain constant system frequency. This electronic controller reacts more quickly than a mechanical governor after a frequency change is observed. However, it is still limited by the delay in observing measurable frequency changes introduced by the inertia of the rotating machinery and phase shift noise on the alternator output. To applicant's knowledge, this is true of other attempts at electronic load control governing such as, for example, referred to by R. J. Armstrong—Evans in "Micro-Hydro as an Appropriate Technology in Developing Countries" found in *Water Power '79 Abstracts* of the International Conference on Small Scale Hydro, Oct. 1-3, 1979, sponsored by the U.S. Army Corp of Engineers and the U.S. Department of Energy. The foregoing works from New Zealand and England introduce the use of dummy loads and governing by coupling and uncoupling such loads across the output terminals for maintaining a specified load level. However, such governors respond to changes in frequency output and therefore to mechanical changes in speed or angular velocity, with inherent limitations in response time.

The closest United States patent of which applicant is aware is the Lydick U.S. Pat. No. 3,546,533. This patent describes a protective device designed to take drastic action by cutting out loads in an electrical power system. The Lydick device is frequency responsive and therefore responds only after inertial changes in speed of rotation. It operates at a high deviation threshold of measured frequency from a standard frequency and can provide only a fixed quantum load change in response to a deviation exceeding the threshold. Lydick makes no provision for switching loads back into the system and is intended for emergency blackout and brownout situations.

SUMMARY OF THE INVENTION

In order to accomplish these results, the present invention provides a first governing arrangement operatively responsive to electrical phase shift of the electrical power output relative to the rotating shaft of an AC generator. By a series of switches or relays, the first governor controls a series of dump loads for switching dump load increments into and out of the output load circuit of the AC alternator in response to measured phase shifts. A feature and advantage of this arrangement is that the governor can respond to near-instantaneous electrical phase shifts in the power output corresponding to changes in load at the output circuit. Within one to two cycles of the rotating shaft, the governor reacts to maintain the load on the output circuit at a substantially constant level corresponding to a specified phase lag interval of the electrical power output relative to the rotating shaft. The first governing arrangement thus maintains a desired phase lag interval of the electrical power signal relative to the shaft corresponding to a predetermined load level for the output circuit.

According to another aspect of the invention, a second governing arrangement is provided operatively responsive to the speed of rotation or angular velocity of the shaft corresponding to changes in the power level of the AC alternator. The second governing arrangement responds to the longer term inertial or mechanical variations in the AC alternator by sensing shaft rotation speed.

The second governing function responds over a longer period, for example, four to sixteen cycles, for maintaining a substantially constant angular velocity or speed of rotation of the AC alternator shaft.

In the preferred embodiment, the first and second governing arrangements are cooperatively integrated into the electronic governor. The second governing arrangement responding to changes in the speed of rotation of the shaft, as measured by period or frequency changes in a shaft signal, calculates and determines the new load level at the output necessary for maintaining the desired speed of rotation. The new load level corresponds to a new specified phase lag interval of the power output signal relative to the shaft rotation providing a new reference standard for the first governing arrangement. The first governing arrangement thereafter responds to phase shifts from the desired or newly specified phase lag interval, switching loads into and out of the output circuit for achieving and stabilizing the phase lag interval at the new desired level or standard.

Furthermore, in the preferred examples, the two-level governing arrangement or double governor is achieved in the context of a digital electronic governor. A sensor or transducer is provided for sensing the rotation of the AC alternator shaft and generating a periodic shaft signal. The phase of the electrical output from the AC alternator is detected providing a corresponding periodic power signal. These two signals are appropriately conditioned for digital processing and gated and compared for indicating and marking the phase shift and resulting phase lag interval of the power signal relative to the shaft signal corresponding to load changes on the output circuit. A stable clock provides high frequency timing signals at a frequency substantially higher than the shaft and power signals for marking and timing the intervals.

The digital electronic governor includes a first counter for counting the clock signals during the phase lag interval between the power signal and shaft signal while a second counter counts the clock signals during the balance of each period exclusive of the phase lag interval. A digital computer, such as a microcomputer coupled to the gate, clock, and counters, calculates the phase lag interval for successive counter measurements and determines deviations from the standard phase lag interval. The computer is programmed for calculating the necessary change in load at the output for stabilizing the power signal at the desired phase lag interval relative to the shaft signal, and for generating corresponding load signals. Through a series of switches or relays, the load signals control a plurality of dump load increments for switching appropriate loads into and out of the output circuit for restoring and maintaining the desired phase lag interval.

The microcomputer, during each period, counts the different portions of the period divided between the phase lag interval and balance of the shaft rotation period in the first and second counters. These counts are summed by the computer for measuring the duration of each successive shaft period for detecting changes in the period or frequency of the output indicating changes in speed of rotation of the shaft. Such inertial changes correspond to changes in the input power level of the AC alternator requiring a new load level at the output to maintain a constant speed or angular velocity of the shaft. The computer is programmed for calculating the necessary change in load for stabilizing the shaft at a desired speed of rotation, for example, to maintain the electrical output at 60 cycles per second. The new load level for restoring the desired speed of rotation corresponds to a new phase lag interval of the electrical output relative to the rotating shaft calculated by the computer. This phase lag interval standard, established by the second governing arrangement, becomes the standard with reference to which the first governing arrangement then operates. Thus, the first governing arrangement or function thereafter responds to phase shifts or deviations from the new phase lag interval standard for switching load increments into and out of the output circuit for maintaining the new standard.

It is important to note that the second governing function, the shaft speed rotation governor, does not bypass the first governor or phase governor. Rather, the second governor or governing function thoroughly incorporates and utilizes the load changing capability of the first governor in order to maintain a constant shaft speed rotation over the longer run. The shaft rotation speed governor thus adjusts the standard phase lag interval for the electrical power phase governor so that the latter governor maintains the phase lag interval at a new standard or level dictated by the shaft rotation speed governor. The phase interval governor continues to control the switching of dump load increments to maintain a total constant load at the output. However, the value of the total load level is dictated by the shaft rotation speed governor.

A feature and advantage of the invention is that the first governor or phase governor responds before there is measurable mechanical inertial response of the system. This is because the first governor responds to the near instantaneous electrical phase shifts between the power signal and the shaft signal heretofore regarded as "system noise" in prior art electronic governors. The first governor is capable of reacting within one to two cycles of rotation of the shaft for switching loads into and out of the output circuit. The second governor responds over a longer term by looking at the total period count corresponding to period or frequency. This in turn reflects mechanical inertial changes, i.e., changes in speed in the shaft. The second governor or speed governor resets the phase interval standard maintained by the first governor as the power levels of the system change. The first governor or phase governor is the short-term high speed response governor, while the second governor or speed governor is the slower, long-term standard changing and standard defining governor setting the boundaries within which the first governor operates.

OBJECTS OF THE INVENTION

In view of the above it is the aim of the invention to achieve the following objects singly or in combination:

to provide a fast-acting electronic load control governor which responds to subtle variations in the output signal, heretofore regarded only as system noise in conventional mechanical and electronic governors;

to provide a first shift-term governing function which responds to the near instantaneous electrical phase shift of the alternator output caused by changes in load in the output circuit; to provide at the same time a second long-term governing function which responds to inertial changes in the speed of rotation or angular velocity of the alternator shaft measured by way of changes in period or frequency of the shaft rotation.

to control and stabilize the output of power generating systems by a two-level governor or double governing function within which the first governor responds within one or two cycles to near instantaneous electrical shifts in the output and in which the second governing function responds to longer term inertial changes and sets the governing standard within which the short-term fast-acting governor operates;

to control and stabilize the output of power systems by switching dummy loads into and out of the load circuit in response both to short-term and to long-term variations;

to provide a governing system which may be implemented by digital computer means for high speed computation;

to provide a governing system with high accuracy and reliability based upon a stable source or standard, such as, for example, a crystal controlled clock;

to provide a governing system suitable for use with emerging and decentralized sources of power; and to provide an effective low cost governing system which replaces higher cost sophisticated equipment.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
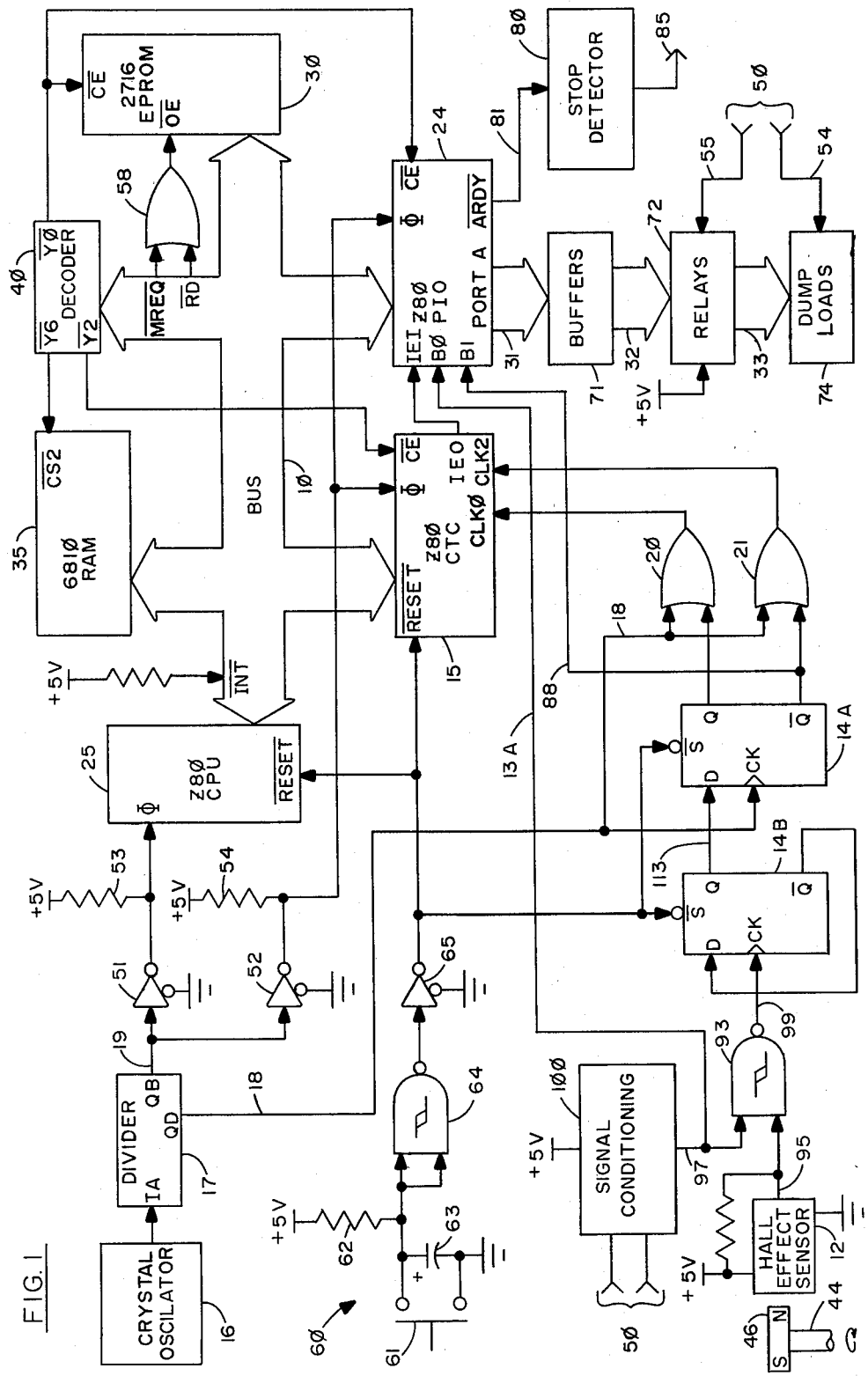
FIG. 1 is a system block diagram of the digital electronic governor according to the present invention.

A digital electronic governor 10 in accordance with the present invention is shown generally in the system diagram of FIG. 1. The electronic governor is described in sequence with reference to the input signal and counter section, the clock section, the microcomputer group, the output section, and also a reset group. These sections or groups of the digital electronic governor are distinguished for clarity in description. They are fully integrated in the governor and, of course, cannot actually be separated. The input signal and counting section comprises the lower lefthand portion of the system block diagram. In the middle of this section, the shaft signal and a power signal or voltage signal are appropriately formed on lines 95 and 97 respectively and applied to NAND gate 93 such as a 74 LS132 Schmitt trigger. The input signal on line 97 also referred to in the specification and claims as the "power signal", is derived from the output of an AC alternator, not shown, through signal conditioner 100. The sinusoidal AC alternator output appearing at 50 is shown in FIG. 3A of the timing diagram. After processing by the voltage signal input conditioner 100, the "power signal" appears on line 97 as shown in FIG. 3B.

The input to signal shaper and conditioner 100 is a voltage signal from the AC alternator. The output is a train of phase timing pulses. Each pulse marks a cycle or period of the voltage signal and the pulse train is referred to herein as the "power signal". The pulse train marks each cycle or period. Negative going pulse edges coincide with positive going zero crossings of the voltage signal, i.e., the positive going output voltage of the alternator.

Figure 2:
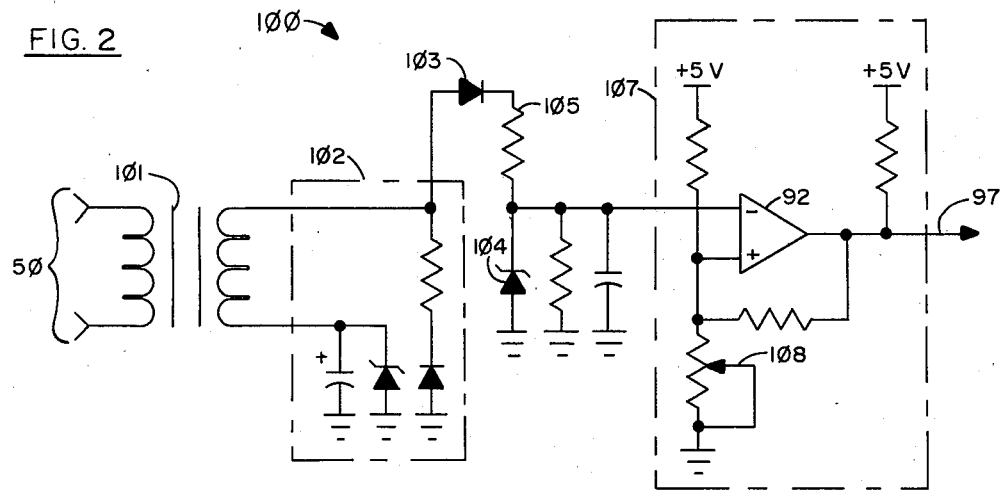
FIG. 2 is a detailed schematic diagram of the power signal conditioner (100) which conditions the alternator AC voltage signal and provides a phase timing signal for the digital electronic governor.

The voltage signal input conditioner 100 is shown in more detail in FIG. 2. The AC alternator output of FIG. 3A is applied to the primary 50 of transformer 101. The low level signal from the secondary of transformer 101 is applied to a signal level shifter 102 which shifts the DC voltage component of the secondary signal to a low positive level to allow zero crossing detection by the comparator 92 which has a single ended power supply. The extent of the level shift is determined by the Zener diode in level shifter 102. The low level signal is rectified by diode 103. Zener diode 104 in conjunction with resistor 105 clips the peaks of the signal. The resistor 105 in conjunction with the following resistor and capacitor forms a low pass filter. Finally, the low-level shifted, rectified, and filtered signal triggers Schmitt trigger 107 to provide the phase marked voltage input signal or power signal as shown in FIG. 3B on line 97. Schmitt trigger 107 is constructed using a comparator 92, such as, for example, an LM 311 comparator.

Returning to FIG. 1, the "shaft signal" on line 95 is derived directly by sensing the rotation of the AC alternator shaft 44. The shaft rotation detector 12 is a Hall effect sensor, sensing the rotation of a magnet 46 fitted to the AC alternator shaft 44. The Hall effect sensor 12 is an on-off device providing directly a square wave output applicable for the subsequent digital processing. A single phase alternator and double pole sensor are described in this example. With appropriate adaptation, multiphase systems and multipole sensors may also be used. Alternatively, instead of the Hall effect sensor, an optical detector or magnetic detector may be used or any detector exactly timed with the shaft. Thus, the shaft rotation speed sensor must be phase locked with the shaft and provide a square wave signal either directly or by subsequent processing for input to NAND gate 93. The shaft signal on line 95 is illustrated at FIG. 3C of the time chart and represents the pulse output of the Hall effect sensor.

The gated composite signal on line 99 from the output of NAND gate 93 is shown at FIG. 3D. The composite signal 3D on line 99 clocks or toggles the flip-flop 14B providing an output at line 113 as illustrated in FIG. 3E of the time chart.

The preferred form of the input shaft signal and the power signal is a square wave with sharp edges and a voltage range at the base from 0–0.7 volts representing logic zero or low level, and a voltage range at the peak of 2.5–5.0 volts repesenting logic level one or high level. The uniformity of square wave and digital pulse wave form is maintained throughout for purposes of digital processing as hereafter described.

Digressing from the description of the input signal and counter section, a clock section or group is provided in the upper lefthand corner of the system block diagram for providing stable clock signals over line 18 for counting and measuring the phase lag interval of the power signal relative to the shaft signal and the period or frequency of the shaft signal. A crystal controlled oscillator 16 provides, for example, a 10 mhz output coupled to frequency divider 17. The divider 17 divides the frequency of the output signal from oscillator 16 providing the lower frequency clock signal of 625 khz or 0.625 mhz on line 18. This is accomplished by the divider in two steps, dividing by two and eight. The clock signal at line 18 is shown at FIG. 3F of the timing chart and provides pulses at a frequency substantially higher than the frequency of the shaft signal, power signal, or composite signal. The clock signal at line 3F is not shown in the same time scale as FIGS. 3A-3E. There would actually be over 10,000 clock oscillations or periods for each cycle or period of the signals at 3B, 3C, or 3E. The clock signal on line 18 is used for counting and measuring the duration of any lag interval between the power signal and the shaft signal, and for counting the duration of each period exclusive of the lag interval. To this end the clock signal is applied to the two standard OR gates 20 and 21 whose outputs are respectively coupled to first and second counters of the counter chip 15. The counter chip may be, for example, a Zilog Z80 CTC with inputs CLK0 and CLK2 representing the inputs to the respective counters.

The counting of clock signals on line 18 alternates between the counters CLK0 and CLK2 of the counter timer chip 15. CTC 15 alternately counts the timing pulses at the two counter inputs according to the alternating state of flip-flop 14A whose outputs Q and $\overline{Q}$ are coupled respectively to OR gates 20 and 21. As flip-flop 14A toggles and alternates output signals between Q and $\overline{Q}$, the clock signals are diverted respectively back and forth through OR gates 20 and 21 to the respective counters CLK-0 and CLK-2.

Figure 3:
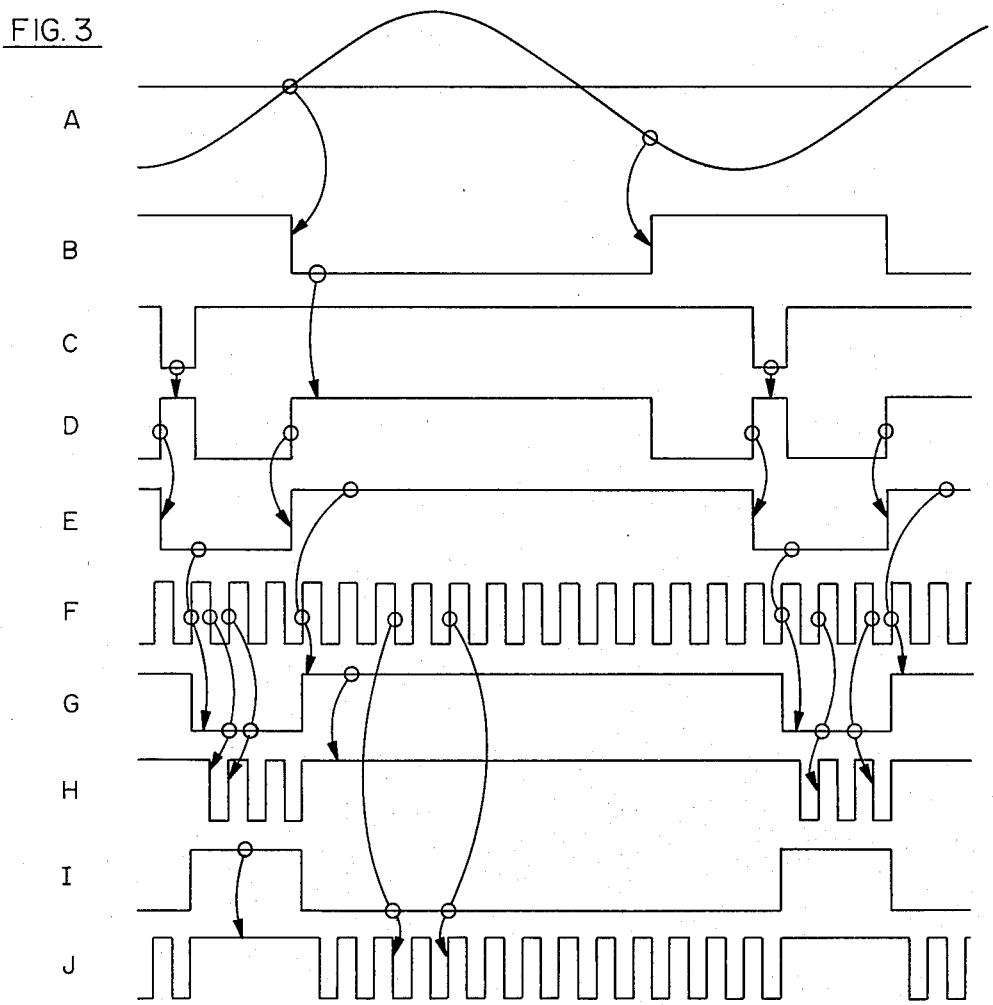
FIG. 3 is a timing diagram comparing signals A-J on various lines of the input section of the digital electronic governor and illustrating the conditioning and gating of the power signal and shaft signal for subsequent counting functions.

Flip-flop 14A is in turn controlled by the noninverted output Q of flip-flop 14B on line 113 fed to the D-input of flip-flop 14A. Flip-flop 14A is clocked by the clock signal on line 18. Referring to the time chart of FIG. 3, the clock signal on line 18 is shown in FIG. 3F. The noninverted Q output of flip-flop 14A is illustrated in FIG. 3G and the output of OR gate 20 coupled to the first counter CLK0 is illustrated in FIG. 3H. It is thus apparent that the first counter is coupled through the logic circuitry to count clock pulses during the phase lag interval between the power signal and shaft signal illustrated respectively in FIGS. 3B and 3C. The length of this phase lag interval provides a near instantaneous measure of the load or change in load in the output load circuit of the AC alternator.

The inverted $\overline{Q}$ output of flip-flop 14A is illustrated in the timing chart by FIG. 3I. The corresponding output of gate 21 coupled to the second counter CLK-2 is shown in FIG. 3J. It is also apparent that the second counter CLK-2 counts clock pulses during the balance of each period exclusive of the phase lag interval.

Additional information about the construction and operation of the electronic governor is also conveyed by the circles and arrows shown on the timing diagram. As illustrated, an event on the timing chart which is circled causes the event to which the connecting arrow points. In some cases two events (circles) lead to a resulting event at the arrow.

The flip-flops for use in the signal input and counting section are positive-edge triggered D type flip-flops with inverted set inputs such as the dual flip-flops of a 74LS74 integrated circuit. The flip-flops divide the counting function during each period between two 16 bit counters, in the counter timer chip 15. The two 16 bit counters are formed by combining or tying the four 8 bit counters of the Zilog Z80 CTC into two pairs, each pair forming a 16 bit counter. Thus, in order to provide greater counting capacity and accuracy channels 0 and 1 are tied together to provide one counter and channels 2 and 3 are tied together to provide the other counter. While one of the counters of CTC 15 is counting either the lag interval or the balance of a period, the previous measurement by the other counter is accessible to the microprocessor through the coupled data lines of the CTC 15 and CPU 25.

The input signal and counter section and the clock signal section provide a continuous running counter with measuring counts continuously available without interfering in the count. The conditioned voltage or power signal on line 97 also actuates the B0 input of the parallel input-output chip 24. This provides an interim signal to the microprocessor CPU 25 indicating, when low, that phase lag interval counting measurement data is available. The processor 25 alternately samples the counting measurement data from the resting counter, alternating between the counters each cycle. The resting counter is identified by the signal on line 88 from the $\overline{Q}$ output of flip-flop 14A which actuates the B1 input of PIO chip 24. For example, when 88 is low it indicates to the computer that the counter with input CLK0 from OR gate 20 is resting.

The microcomputer group of the digital electronic governor includes the microprocessor CPU 25, for example a Zilog Z80 CPU. The memories of the microcomputer group include the 2K Byte memory EPROM 30 such as, for example, an INTEL 2716 chip; and the 128 Byte random access memory RAM 35 such as, for example, a Motorola 6810 RAM. The computer or microcomputer group also includes the address decoder 40 such as a 74 LS 138 generic designation address decoder and the counter timer chip 15 and parallel input-output chip 24 already mentioned. Parallel input-output chip 24 may be, for example, a Zilog Z80 PIO. These various units are all interconnected in the standard manner along respective address lines with A designations and respective data lines with D designations. The precise manner of interconnection of the address lines or ports, the data lines or ports, strobe lines or ports and, other terminal connections, etc., are set forth in the accompanying Table I. This arrangement of the various lines and ports and their interconnection conforms to the requirements of the software of the system summarized in Table II and hereafter described.

The Pin Number Mixing Table I defines the circuit connections between the pin terminal numbers of the respective chips as generically given by the manufacturer, or, for example, as in the *CMOS Cookbook* by Don Lancaster, Howard W. Sams Publications (1977). For the paired numbers separated by a slash in each column, the first number or number to the left of the slash refers to a component number of FIG. 1. The second number to the right of the slash refers to a pin terminal number of that component. It is connected to the component identified at the top of the respective column and the pin terminal number of that component corresponding to the row number to the left.

As for the single numbers in Table I, these refer to the number of a wire designated in FIG. 1. The letter designations are as follows. NC refer to "no connection"; GND is the ground or negative power supply connection; and Vcc is the high level logic voltage, e.g., ±5 volts. It should be noted that the Z80 CPU designated by numeral 25 does not have its own column. As the most common wiring reference component it appears throughout the Table I in the rows and columns where the numeral 25 appears.

TABLE I

PIN WIRING DESIGNATIONS FOR MICROCOMPUTER GROUP

| PIN NUMBER | 24 Z80 PIO | 15 Z80 CTC | 30 2716 EPROM | 35 6810 RAM | 40 74LS138 DECODER |
|---|---|---|---|---|---|
| 1 | 25/12 | 25/7 | 25/37 | GND | 25/1 |
| 2 | 25/13 | 25/9 | 25/36 | 25/14 | 25/2 |
| 3 | 25/10 | 25/10 | 25/35 | 25/15 | 25/3 |
| 4 | 40/15 | 25/13 | 25/34 | 25/12 | 25/4 |
| 5 | 25/38 | GND | 25/33 | 25/8 | 25/5 |
| 6 | 25/39 | 25/21 | 25/32 | 25/7 | Vcc |
| 7 | 71H | 15/22 | 25/31 | 25/9 | NC |
| 8 | 71G | NC | 25/30 | 25/10 | GND |
| 9 | 71F | 15/20 | 25/14 | 25/13 | 35/12 |
| 10 | 71E | 25/20 | 25/15 | 25/38 | NC |
| 11 | 71D | 24/24 | 25/12 | 25/19 | NC |
| 12 | GND | 25/16 | GND | 40/9 | NC |
| 13 | 71C | Vcc | 25/8 | 25/39 | 15/16 |
| 14 | 71B | 25/27 | 25/7 | 25/37 | NC |
| 15 | 71A | 52 | 25/9 | 25/40 | 30/18 |
| 16 | Vcc | 40/13 | 25/10 | 25/22 | Vcc |
| 17 | Vcc | 65 | 25/13 | 25/36 | |
| 18 | 81 | 25/38 | 40/15 | 25/35 | |
| 19 | 25/14 | 25/39 | 25/14 | 25/34 | |
| 20 | 25/15 | 15/9 | 58 | 25/33 | |
| 21 | NC | 21 | Vcc | 25/32 | |
| 22 | NC | 15/7 | 25/39 | 25/31 | |
| 23 | 25/16 | 20 | 25/38 | 25/30 | |
| 24 | 15/11 | Vcc | Vcc | Vcc | |
| 25 | 52 | 25/14 | | | |
| 26 | Vcc | 25/15 | | | |
| 27 | 89 | 25/12 | | | |
| 28 | 88 | 25/8 | | | |
| 29 | NC | | | | |
| 30 | NC | | | | |
| 31 | NC | | | | |
| 32 | NC | | | | |
| 33 | NC | | | | |
| 34 | NC | | | | |
| 35 | 25/21 | | | | |
| 36 | 25/20 | | | | |
| 37 | 25/27 | | | | |
| 38 | 25/9 | | | | |
| 39 | 25/7 | | | | |
| 40 | 25/8 | | | | |

Referring again to FIG. 1, the crystal controlled oscillator 16 and divider 17 provide a highly stable and accurate clock system for the electronic governor. The divider 17, as previously mentioned, divides the output of oscillator 16 by sixteen in two steps to provide the count pulses on line 18 for measuring the duration of the phase lag interval and the period of the shaft signal. The divider also provides an output signal on line 19 which is divided by four. The divide-by-four clock signal from divider 17 is coupled through two 74 LS 368 tristate output devices or inverters 51 and 52, each of which is followed by a 360 ohm. pull-up resistor 53 and 54 respectively. The pull-up resistor guarantees that the high level voltage along these lines will be within the necessary range for the high level or logic 1 at the respective clock inputs of devices 25, 15 and 24. The high current sinking capability of the tristate output devices 51 and 52 also assures that the low level or logic 0 voltage will be maintained within the range specified for each device. The clock signal from the tristate device 51 is coupled to the clock signal input $\Phi$ of the processor CPU 25. The clock signal from tristate device 52 is coupled to the respective clock signal input $\Phi$ of PIO chip 24 and CTC chip 15.

The divider 17 of the 74 LS 93 type includes divide-by-two and divide-by-eight counters. In order to provide the different clock signals on lines 18 and 19, the divide-by-two output $Q_A$ is coupled to the divide-by-eight input $I_D$ causing a divide-by-four clock signal on output $Q_B$ and a divide-by-sixteen at output $Q_D$. These output clock signal pulses represent divisions of the input signal at the input $I_A$ from the clock oscillator 16. The reset inputs of divider 17 are tied to ground and held at a low state to permit the counters to continuously count. EPROM memory 30 requires an output enable signal $\overline{OE}$ in addition to the chip enable signal $\overline{CE}$ from the address decoder 40. The output enable signal $\overline{OE}$ for actuating EPROM memory 30 is derived from OR gate 58 which in turn has two inputs. One input is the $\overline{RD}$ "Read Not" output from CPU 25 which is low during reading. The other input is the $\overline{MREQ}$ signal or "Memory Request Not" signal from CPU 25. The output enable signal $\overline{OE}$ derived through OR gate 58 enables the EPROM memory 30 to respond only during a memory read operation, thus, during a memory read operation there are two low inputs to OR gate 58 providing a low output which constitutes the output enable signal $\overline{OE}$. If this coincides with the chip enable signal $\overline{CE}$ then the EPROM memory 30 will respond to address signals on the address line and provide the requested data on the data bus which is within bus 10.

A hexidecimal listing of the Z80 Instruction Codes or Machine Language Code listing stored in EPROM memory 30 is set forth in Table II. This code listing is based upon the Zilog Z80 instruction set. The code listing is set forth in consecutive rows and columns which represent the inherent address locations of the EPROM 30. Each code entry is represented by two hexidecimal digits equivalent to 8 bits or 1 Byte. Each row therefore includes sixteen Bytes in consecutive order. Table II is therefore a graphical or schematic presentation of the address locations of the EPROM 30 and showing, in fact, the contents of each memory location used to store the program.

The leftmost column contains three hexidecimal digit numbers arranged vertically. Each of the numbers in this first column designates the address location of the first Byte of the corresponding row as stored in the EPROM memory 30. For example, 000 is the address location of Byte C3. The sixteen Bytes of the first row are therefore at address locations 000-00F (decimal equivalent 0-15) expressed in hexidecimal digits. The address of the first Byte FF of the second row is 010 (decimal equivalent 16), or more accurately, FF is the contents of location 010. The sixteen Bytes of row 2 are therefore at address locations 010-01F (decimal equivalent 16-31). The address location of the first Byte 20 of the third row is 020 (decimal equivalent 32), etc.

Thus, the hexidecimal values of the machine code listings are read across the columns 0-F (decimal equivalent 0-15) from left to right in each consecutive row. The right hand 0 of the row number is replaced by the column number of a code entry to give the EPROM address and memory location. Because each hexidecimal digit represents 4 bits, the two-digit hexidecimal group represents 1 Byte or 8 bits. All of the code listings are stored in the EPROM memory for execution by the microcomputer group.

TABLE II
Z80 CPU INSTRUCTION CODES

ADDRESS LOCATION FIRST BYTE OF EACH ROW

HEXIDECIMAL LISTING OF Z80 MACHINE LANGUAGE INSTRUCTION CODES

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 000 | C3 | 80 | 00 | FF | FF | FF | FF | 43 | 4F | 50 | 59 | 52 | 49 | 47 | 48 | 54 |
| 010 | FF | FF | 43 | 02 | FF | FF | 43 | 02 | 41 | 02 | 23 | 01 | FF | FF | FF | FF |
| 020 | 20 | 30 | 33 | 20 | 4D | 41 | 52 | 43 | 48 | 20 | 31 | 39 | 38 | 31 | 20 | 20 |
| 030 | 52 | 53 | 4B | 4C | 45 | 49 | 4E | 53 | 43 | 48 | 4D | 49 | 44 | 54 | 4A | 52 |
| 040 | 20 | 4B | 4C | 45 | 49 | 4E | 53 | 43 | 48 | 4D | 49 | 44 | 54 | 20 | 26 | 20 |
| 050 | 44 | 55 | 54 | 54 | 49 | 4E | 47 | 20 | 37 | 33 | 4D | 41 | 49 | 4E | 53 | 54 |
| 060 | 20 | 50 | 49 | 54 | 54 | 53 | 46 | 49 | 45 | 4C | 44 | 20 | 4D | 45 | 20 | 20 |
| 070 | 20 | 28 | 32 | 30 | 37 | 29 | 34 | 38 | 37 | 2D | 33 | 33 | 32 | 38 | 20 | 20 |
| 080 | ED | 5E | 3E | 00 | ED | 47 | 31 | 80 | 33 | 18 | 04 | FF | FF | FF | FF | 06 |
| 090 | 10 | 0E | 10 | ED | 49 | 16 | 47 | 1E | D7 | 0E | 00 | ED | 51 | ED | 49 | 04 |
| 0A0 | ED | 59 | ED | 49 | 04 | ED | 51 | ED | 49 | 04 | ED | 59 | ED | 49 | 18 | 04 |
| 0B0 | FF | FF | FF | FF | 06 | 01 | 0E | 0F | ED | 49 | 0E | 03 | ED | 49 | 0E | 18 |
| 0C0 | ED | 49 | 05 | AF | ED | 79 | 06 | 03 | 0E | CF | ED | 49 | 0E | 0F | ED | 49 |
| 0D0 | 0E | 17 | ED | 49 | 0E | FD | ED | 49 | 0E | 1A | ED | 49 | 18 | 04 | FF | FF |
| 0E0 | FF | FF | 21 | 50 | 0A | 22 | 00 | 33 | 22 | 02 | 33 | 21 | 00 | 00 | 22 | 04 |
| 0F0 | 33 | AF | 32 | 0C | 33 | 18 | 04 | FF | FF | FF | FF | FB | 18 | 04 | FF | FF |
| 100 | FF | FF | CD | 0B | 01 | 18 | FB | FF | FF | FF | FF | 3A | 0E | 33 | 06 | 02 |
| 110 | ED | 48 | A9 | E6 | 02 | 28 | F4 | 79 | 32 | 0E | 33 | CD | 23 | 01 | C9 | FF |
| 120 | FF | FF | FF | 08 | D9 | 06 | 02 | ED | 78 | 4F | E6 | 02 | F6 | 10 | 47 | ED |
| 130 | 78 | ED | 44 | 6F | 04 | ED | 78 | ED | 44 | 67 | 3E | 00 | 16 | D7 | ED | 51 |
| 140 | ED | 79 | 05 | 16 | 47 | ED | 51 | ED | 79 | CB | 41 | 20 | 06 | 18 | 5D | FF |
| 150 | FF | FF | FF | 22 | 00 | 33 | EB | 2A | 02 | 33 | AF | ED | 52 | EB | 2A | 06 |
| 160 | 33 | B7 | ED | 5A | FA | 79 | 01 | EB | 2A | A1 | 02 | B7 | ED | 52 | EB | F2 |
| 170 | 7E | 01 | 2A | A1 | 02 | 3E | F0 | 18 | 05 | 21 | 00 | 00 | 3E | 0F | 32 | 0D |
| 180 | 33 | 22 | 06 | 33 | ED | 5B | 9F | 02 | 19 | AF | 06 | 08 | 11 | 8F | 02 | EB |
| 190 | C5 | 4E | 23 | 46 | 23 | EB | B7 | ED | 42 | 30 | 01 | 09 | 17 | C1 | 10 | EF |
| 1A0 | 2F | 06 | 00 | ED | 79 | C3 | 3A | 02 | FF | FF | FF | FF | ED | 5B | 00 | 33 |
| 1B0 | 19 | EB | 21 | B1 | 28 | AF | ED | 52 | AF | EB | 2A | 04 | 33 | ED | 5A | E2 |
| 1C0 | D0 | 01 | CB | 7A | 28 | 05 | 21 | 00 | 80 | 18 | 05 | 21 | FF | 7F | 18 | 00 |
| 1D0 | 3E | 04 | 47 | 3A | 0C | 33 | 3C | 32 | 0C | 33 | B8 | DA | 3A | 02 | CD | 5E |
| 1E0 | 02 | ED | 5B | 08 | 33 | 22 | 08 | 33 | 29 | B7 | ED | 52 | F5 | E2 | FC | 01 |
| 1F0 | CB | 7A | 28 | 05 | 21 | 00 | 80 | 18 | 03 | 21 | FF | 7F | F1 | FA | 04 | 02 |
| 200 | 3E | F0 | 18 | 02 | 3E | 0F | 47 | 3A | 0D | 33 | A0 | 20 | 1D | 3E | 04 | CB |
| 210 | 25 | CB | 14 | CB | 25 | CB | 14 | CD | 5E | 02 | EB | 2A | 02 | 33 | B7 | ED |
| 220 | 5A | F2 | 27 | 02 | 21 | 00 | 00 | 22 | 02 | 33 | 21 | 00 | 00 | 22 | 04 | 33 |
| 230 | AF | 32 | 0C | 33 | 18 | 04 | FF | FF | FF | FF | D9 | 08 | C9 | FF | FF | FF |
| 240 | FF | ED | 4D | FB | ED | 4D | FF | FF | FF | FF | F5 | 7D | 2F | 6F | 7C | 2F |
| 250 | 67 | 23 | AC | E6 | 80 | 28 | 01 | 2B | F1 | C9 | FF | FF | FF | FF | C5 | D5 |
| 260 | 01 | 00 | 10 | 57 | AF | CB | 7C | 28 | 05 | CD | 4A | 02 | 0E | F0 | 29 | 17 |
| 270 | 92 | 23 | 30 | 02 | 82 | 2B | 10 | F6 | CB | 3A | 92 | 38 | 03 | 28 | 01 | 23 |
| 280 | AF | CB | 79 | 28 | 03 | CD | 4A | 02 | D1 | C1 | C9 | FF | FF | FF | FF | 50 |
| 290 | 00 | 00 | 00 | 28 | 00 | 28 | 00 | 28 | 00 | 28 | 00 | 28 | 00 | 14 | 00 | 0A |
| 2A0 | 00 | 2C | 01 | FF | FF | FF | FF | FF | FF | FF | FF | FF | FF | FF | FF | FF |

The program listing contains three constants which must be adjusted and particularly selected for the power system application. Different types of generating systems, such as, for example, turbines, alternators, diesel engines, other hydro sources, windmills, etc., require a change in these constants suited to the characteristics of the system.

The scale constant provides a scale factor between the two governors or governing functions and is located at EPROM address location 20E, represented on Table II at row 200, column E. The scale factor presently at this location is the scale constant 04 suitable for an alternator and drive engine according to the present example. For example, this scale constant is generally suitable for a two pole, single phase, small scale alternator, e.g., 2½ KW capacity, driven by a small gasoline engine, e.g., a 5 HP Briggs and Stratton engine. This scale factor converts a speed correction calculated by the microcomputer group for the speed governing function into a phase lag interval or phase lag count of clock signal units suitable for implementing the speed correction and maintaining a constant desired speed or frequency of, for example, sixty cycles per second.

The second pertinent constant is the speed governor averaging number found at EPROM memory location 1D2 represented at row 1D0, column 2. The speed governor averaging number at this location is 04. This speed governor averaging number is the number of cycles over which the speed of the shaft rotation is taken to calculate the average. In this case, it is four periods.

The third relevant constant is actually a set of constants representing the load increments which may be switched in and out of the alternator output circuit for maintaining a constant output load and corresponding phase lag interval of the power signal relative to the shaft signal. Typically, eight different load increments may be provided. In the preferred form of the present invention, the eight load increments bear to each other the ratio of a binary power series progression for directly translating and controlling the total calculated load corresponding to the value of a binary Byte number. In the example of Table II, the load increment values in the form of two Bytes are found at address locations 28F through 29E, that is, represented in Table II by row 280, column F through row 290, column E. In this example, the load increment values are scaled in the proportion of 0050, 0000, 0028, 0028, 0028, 0028, 0028, and 0014, hexidecimal numbers. These load value increments may be changed according to the application and load values desired.

In the present case where sixty cycles per second is desired to be maintained, the computer is directed to add four periods of clock pulses and divide by four to determine the average value of the angular velocity, frequency, or period. From successive average values the microcomputer calculates the deviation of speed, frequency, or period from a desired standard, e.g., 60 Hz, and also the rate of deviation. All measurements and calculations are in units of clock counts. The speed, frequency, or period correction is then calculated, converted into an equivalent load count or phase lag interval by applying the scale factor constant, and made available to the phase governor for maintaining the corrected speed, frequency, or period. The phase governor acts by switching load increments in and out of the output circuit to maintain the new standard calculated by the computer for long-term stability of the frequency. During short-term phase shifts or changes, the phase governor continues to function for fast response in maintaining the new standard as heretofore described.

Turning to the reset section or portion of the computer, the reset circuit 60 includes reset button 61 which serves to reset the processor 25 and the remaining components of the microcomputer. The reset circuit 60 includes a resistor 62 and capacitor 63 which allow a reset on start-up by holding the input to Schmidt trigger 64 low for a sufficient time for the power supply to stabilize. This assures adequate power to all the chips in the computer group and correct functioning of all the components.

This is accomplished by holding the processor reset input low during the delay time period while the input to Schmitt trigger 64 is held low. As the capacitor 63 charges, the voltage rises at the input to the Schmitt trigger 64. The high input disables the reset at processor 25 allowing the system to begin execution of the program.

The reset sequence is initiated by compressing the reset button 61 thereby discharging capacitor 63, the same state as at power start-up. The reset circuit also performs a debouncing function as follows. If there is contact bounce during depression of the reset button, the delayed response time of the capacitor and resistor network 62 and 63 prevents response to the bounce. Thus, despite vibration at the reset button, the reset sequence perceives along its normal course.

The output section of the electronic governor begins at the A Port or A output lines of the parallel input-output chip 24. The A Port provides eight bit output lines to control eight loads which perform the governing function for the AC alternator power system according to the invention. The A Port lines 31 designated A0 to A7 for the Zilog Z80PIO are coupled through buffers 71, for example inverting tristate buffer with their outputs enabled. With the buffers in the on state, the outputs from the buffers on lines 32 will be driven high or low depending on the state or logic level on the buffer inputs from lines 31. The buffered output signals on lines 32 are coupled directly to a set of eight relays 72 which in turn over lines 33 control the coupling of eight loads 74 into the system power output circuit to perform the governing function.

Figure 5:
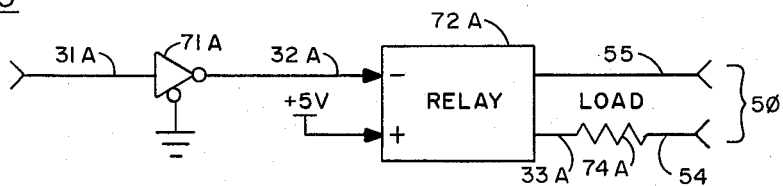
FIG. 5 is a detailed schematic diagram of one of the eight circuit elements comprising the dump loads, including one of eight buffers (71), one of eight solid state relays (72), and one of eight dump loads (74) at the output of the digital electronic governor.

One of the eight parallel output circuits is shown in further detail in FIG. 5. The components of the single circuit element of FIG. 5 are identified by the same reference numbers used to identify the parallel set of eight such circuit elements in FIG. 1.

The letter designation "A" has been added to the identifying numerals to indicate that a single one of the eight circuits is shown. The tristate buffer 71A provides the current sinking capability necessary to turn on relay 72A. The positive input of relay 72A is tied to a +5 volt source while the negative input is connected through the respective buffer 71A to the output line 31A of Port A. A high level voltage or logic 1 on output line 31A will therefore turn on the respective relay. This is because the tristate buffer device 71A inverts the output 1 providing a low level voltage or logic 0 which sinks current from the high voltage source through the relay to ground, actuating the relay.

The relays 72 are electronic relays actuated by a 12 milliamp current. The relays may be, for example, triacs. The buffers, e.g., 71A, must therefore have sufficient current sinking capability to turn on the respective relays used.

Figure 6:
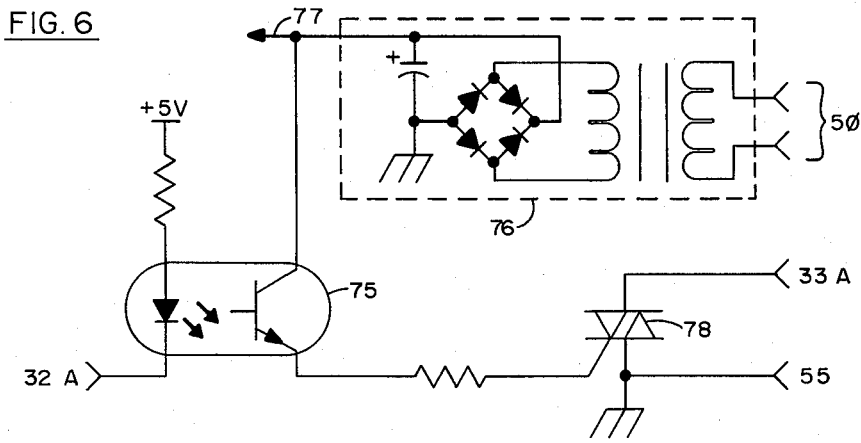
FIG. 6 is a detailed circuit diagram of an alternative circuit which can replace one of the eight circuit relays (72)

An alternative circuit which can be used to replace one of the eight circuit relays 72 is shown in FIG. 6. This substitute relay contains an optical isolator 75 connected into the buffer output line 32A. The optical isolator 75 controls the gate of triac 78 which performs the relay function on line 33a coupled to one of the dump loads. The dump load itself would be coupled into the power output circuit of the AC alternator on lines 54 and 55 in the same manner as the circuit element of FIG. 5.

The alternative relay output circuit element also includes its own power supply 76 connected to the system power, i.e., alternator output 50. The power supply 76 can also supply other similar relay and buffer output circuits on line 77.

Figure 7:
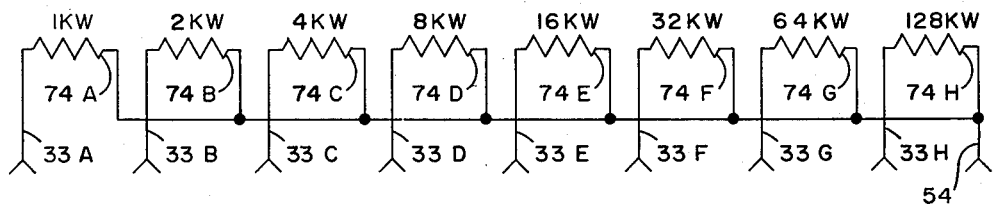
FIG. 7 is a detailed circuit diagram of an example of a set of eight dump loads (74) weighted in a binary power progression complementary to and suitable for control by a binary eight-bit Byte output load signal from the digital electronic governor at port A of chip (24).

A set of eight dump loads 74A–74H weighted in a binary power progression is illustrated in FIG. 7. Such a load value relationship or progression is complementary to and suitable for control by a binary eight bit Byte output load signal from the digital electronic governor at Port A of chip 24. The eight binary weighted dump loads 74A–74H are connected respectively to lines 33A–33H from the relays 72. The binary load progression permits adding or subtracting in increments of 1/255 of the total dump load. Counting 0 load, there are therefore 256 incremental steps or load levels which may be switched into the power output circuit according to the binary eight bit Byte output. By this load sequence the smallest possible incremental selectivity is achieved with only eight different loads. By way of the buffers 71 and relays 72, the binary progression dump loads respond directly to the binary Byte translating the number into a proportional load which is coupled into the power output circuit.

Referring again to the power signal conditioning circuit 100, illustrated in detail in FIG. 2, the Schmitt trigger 107 constructed using comparator 92, also includes variable resistance 108 which is used to set the trigger point or leading edge of the power signal. Using variable resistor 108, one can set the leading or negative going edge of the power signal pulse in FIG. 3B ahead of the respective 0-crossing shown in FIG. 3A.

The positive-going edge may be sufficiently in advance of the 0 crossing so that the Port A output on lines 31 comes at the same time as 0 crossing. This is suitable for the alternate relay and buffer of FIG. 3. With this arrangement the system can have automatic 0 voltage switching of dump loads. Thus, the loads are switched at the middle of the 0 crossings, thereby avoiding transients.

Other aspects of the output section of the electronic governor is the programmed stop detector or indicator 80 shown at the lower right-hand quarter of the system block diagram of FIG. 1. The stop detector 80 provides a warning signal in the event of failure of the computer caused by stoppage of the running of the program. The warning signal on line 85 may be used to alert an operator or directly to shut down the systems. The program stop indicator 80 receives pulses from the $\overline{ARDY}$ or "A-Ready Not" output of the PIO chip 24 when data is available at the A Port output lines 31. The $\overline{ARDY}$ output provides a signal every cycle as the processor puts data at the A port outputs. Each time the processor outputs data at the A Port output lines 31, designated A0–A7 on the Z80PIO type chip 24, a signal is provided at the $\overline{ARDY}$ output on line 81 to the stop detector 80. During normal operation this will happen once every cycle or sixty times per second, and the power system is functioning normally. As long as signals appear on line 81, program stop indicator 80 outputs a low state at the output.

Figure 4:
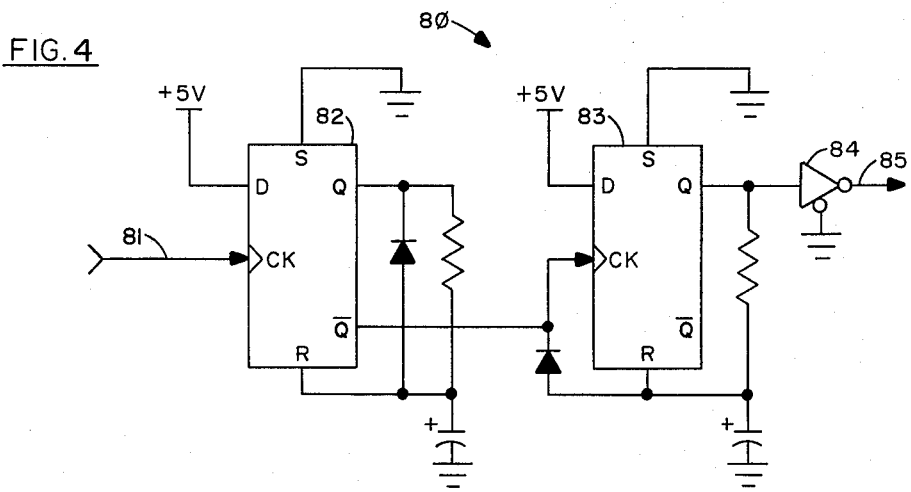
FIG. 4 is a detailed schematic diagram of the stop detector or program stop indicator (80) in the form of positive and negative edge triggered full monostable multivibrators.

A schematic diagram of one example for the stop detector 80 is shown in FIG. 4. Two monostable multivibrators 82 and 83 cooperate to provide one high level output as long as multivibrator 82 keeps receiving signals on line 81 and resetting multivibrator 83. The high level output is inverted by the tristate invertor 84. A low level therefore normally appears at the output 85 as long as pulses appear on line 81 from the $\overline{ARDY}$ output of PIO chip 24.

Monostable multivibrator 82 is positive edge triggered and is constructed using an edge trigger flip-flop to afford a negative pulse output of timed duration. For example, the positive edge triggered monostable multivibrator may be constructed from one-half of a generic 4013 CMOS chip.

A second positive edge triggered or triggerable monostable multivibrator 83 is also connected using an edge triggered flip-flop but which outputs a positive pulse of timed duration. The entire monostable multivibrator of two flip-flops can be constructed from a single 4013 CMOS chip. The construction of such monostable multivibrators is described in the *CMOS Cookbook* by Don Lancaster, publisher Howard Sams Publication (1977).

As long as the positive going edges input to multivibrator 82 are close enough together, the output from multivibrator 83 remains high. This is inverted by buffer 84 so the final output remains low. In the event of breakdown or failure, the buffer 84 stops sinking current to ground, a normally closed relay closes and an alarm may go off on its own battery supply. This, if power fails, the voltage level at 84 will inevitably go low and a relay with its own auxiliary power supply can provide the desired warning or corrective action.

The entire governor can be provided with its own auxiliary power supply in the form of a storage battery to allow start-up with no power. In that event, a battery charger is included for charging up the battery when the system is operating. The power supply connection for each chip may also be coupled to the auxiliary power supply. It should be noted that the power supply connection is not shown in each instance for the chip components shown in the system block diagram of FIG. 1.

Although the invention has been described with reference to specific example embodiments it will be appreciated that it is intended to cover all modifications and equivalents within the scope of the appended claims.

What is claimed is:

1. An electronic governor for controlling and stabilizing the electrical power output delivered to an output circuit by an AC alternator having a rotating shaft driven by a source, comprising sensing and detecting means for sensing and detecting a phase shift of the electrical power output relative to the rotating shaft corresponding to changes in load at the output circuit and for generating corresponding phase shift signals, a plurality of dump load means, and phase shift governing means comprising switching means operatively coupled for switching said dump load means into and out of the output circuit in response to said phase shift signals.

2. The electronic governor of claim 1, wherein said sensing and detecting means is also coupled for sensing and detecting changes in the speed of rotation of the shaft corresponding to changes in power level of the AC generator and for generating corresponding shaft rotation speed signals, and further comprising speed governing means operatively coupled for controlling the phase shift governing means in response to said shaft rotation speed signals.

3. An electronic governor for controlling and stabilizing the electrical power output delivered to an output circuit by an AC alternator having a rotating shaft driven by a source comprising circuit means for sensing and detecting a phase shift of the electrical power output relative to the rotating shaft corresponding to changes in load on the output circuit and for generating corresponding phase shift signals, first governing means operatively responsive to said phase shift signals for stabilizing said phase shift of the electrical power output at a specified phase lag interval, said circuit means being operatively responsive for sensing and detecting changes in the speed of rotation of the shaft corresponding to changes in the power level of the AC generator and for generating corresponding shaft rotation speed signals, and second governing means operatively responsive to said shaft rotation speed signals for stabilizing said rotating shaft at a specified speed of rotation.

4. The electronic governor of claim 4, further comprising a plurality of dump load means and wherein said first governing means comprises switching means operatively responsive to said phase shift signals for switching dump loads into or out of the output circuit for maintaining said specified phase lag interval.

5. A digital electronic governor for controlling and stabilizing the electrical power output delivered to an output circuit by an AC alternator having a shaft driven by a source comprising: sensor means for sensing the rotation of the AC alternator shaft and for generating a periodic shaft signal; means for detecting the phase of the output from the AC alternator and providing a corresponding periodic power signal; gate means for gating and comparing the shaft signal and power signal for indicating the phase shift and resulting phase lag interval of the power signal relative to the shaft signal corresponding to the load on the output circuit during each period of said shaft signal; clock means for generating a high frequency clock signal having frequency substantially higher than the shaft and power signals; first counter means operatively coupled for counting clock signals during the phase lag interval between the power signal and shaft signal for successive periods, thereby providing a measure of the phase lag interval for successive periods; computer means coupled to said gate means, clock means, and first counter means, said computer being programmed for calculating the phase lag interval for successive counter measurements, for calculating the deviation in phase from a standard phase lag interval, for calculating the desired change in load for stabilizing the power signal at said standard phase lag interval relative to the shaft signal, and for providing corresponding load signals; a plurality of dump load means; switching means operatively coupled for switching said dump load means into or out of the power output circuit in response to said load signals, thereby restoring the standard phase lag interval.

6. The governor of claim 5, further comprising second counter means for counting the clock signals during the balance of each period of the shaft signal exclusive of the phase lag interval, said second counter means also coupled to the computer means, said computer means being programmed for summing the clock signal counts from the first and second counters, for measuring the duration of successive shaft periods and for comparing them with a specified standard period or frequency, thereby detecting changes in the period indicating changes in speed of rotation of the shaft, said computer means also being programmed for calculating the desired change in load for stabilizing the shaft at a desired speed of rotation and for generating corresponding load signals, said governor thereby performing first and second governing functions, said first governing function operative in response to changes in the phase lag interval, said second governing function operative in response to changes in the shaft speed rotation.

7. The governor of claim 6, wherein said computer means is programmed for recalculating the desired change in load for stabilizing the shaft at a desired speed of rotation by calculating a new standard phase lag interval appropriate for restoring the desired speed, calculating the desired change in load for achieving said new standard phase lag interval, and for generating corresponding load signals to effect said new standard phase lag interval.

8. The digital electronic governor of claim 5, wherein the plurality of dump load means comprise separate load increments of unequal load values in proportion to a binary progression whereby said load increments represent binary digit places.

9. A method for controlling and stabilizing the electrical power output delivered to an output circuit by an AC alternator having a rotating shaft driven by a source, comprising measuring the phase shift of the electrical power output relative to the rotating shaft corresponding to changes in the load on the output circuit and controlling and stabilizing the electrical power output by switching incremental dump loads into or out of the output circuit of the AC alternator in response to said phase shift for maintaining the electrical power output at a desired specified phase shift relative to the rotating shaft.

10. A method for controlling and stabilizing the electrical power output delivered to an output circuit by an AC alternator having a rotating shaft driven by a source comprising: sensing the rotation of the AC alternator shaft and generating a periodic shaft signal; detecting the phase of the output from the AC alternator and providing a corresponding periodic power signal; gating the shaft signal and power signal for indicating, during each shaft signal period, the electrical phase shift and resulting phase lag interval of the power signal relative to the shaft signal corresponding to load changes on the output circuit; generating a stable high frequency clock signal with frequency substantially higher than the shaft and power signals; counting the clock signals during the phase lag interval between the power signal and the shaft signal for each period, thereby providing a measure of the phase lag interval; calculating the deviation of the measured phase lag interval from a standard phase lag interval and calculating the desired change in load for stabilizing the power signal at the standard phase lag interval relative to the shaft signal; and switching incremental dump loads into or out of the output circuit of the AC alternator for stabilizing the power signal at said standard phase lag interval.

11. The method of claim 10, further comprising: separately counting the clock signals during the balance of each period exclusive of the phase lag interval; summing the count of clock signals from the phase lag interval and the balance of the period excluding the phase lag interval thereby measuring the length of the period; measuring and comparing the length of successive periods for determining changes in the period or frequency corresponding to changes in speed of the shaft; calculating the desired change in load for stabilizing the speed of rotation of the alternator shaft at a desired speed or angular velocity; and switching incremental loads into or out of the output circuit of the AC alternator for maintaining said desired speed of the shaft.

12. The method of claim 11, wherein said step of calculating the desired change in load comprises calculating the equivalent phase lag interval for stabilizing the speed of rotation of the alternator shaft at a desired speed or angular velocity and calculating the desired change in load for effecting the phase lag interval necessary to achieve the desired speed of rotation of the alternator shaft.

13. The method of claim 10, comprising continuously adjusting the desired phase lag interval standard according to detected or sensed changes in the inertial speed of rotation of the shaft as the power level of the AC generator changes, and continuously conforming the phase lag interval of the power signal relative to the shaft signal to the new standard phase lag interval at relatively high speed in response to electrical shifts in said phase.

14. A method for detecting the load on a load circuit receiving electrical power from an AC alternator having a rotating shaft comprising detecting and measuring the phase shift of the electrical power relative to the rotating shaft by sensing the rotation of the AC alternator shaft and generating a periodic shaft signal; detecting the phase of the output from the AC alternator and providing a corresponding periodic power signal; gating the shaft signal and power signal for indicating, during each shaft signal period, the electrical phase shift and resulting phase lag interval of the power signal relative to the shaft signal corresponding to the load on the output circuit during each period of the shaft signal; generating a stable high frequency clock signal with frequency substantially higher than the shaft and power signals; counting the clock signals during the phase lag interval between the power signal and the shaft signal for each period, thereby providing a measure of the phase lag interval; calculating the load corresponding to the phase lag interval measured for each period thereby detecting the load on the output circuit each period; and calculating the rate of change of the phase lag interval for successive periods thereby detecting the rate of change of the load on the load circuit over successive periods.

15. An apparatus for detecting the load on a load circuit receiving electrical power from an AC alternator having a rotating shaft comprising means for detecting and measuring the phase shift of the electrical power relative to the rotating shaft wherein said means comprises sensor means for sensing the rotation of the AC alternator shaft and for generating a periodic shaft signal; means for detecting the phase of the output from the AC alternator and providing a corresponding periodic power signal; gate means for gating and comparing the shaft signal and power signal for indicating the phase shift and resulting phase lag interval of the power signal relative to the shaft signal corresponding to the load on the output circuit during each period of said shaft signal; clock means for generating a high frequency clock signal having a frequency substantially higher than the shaft and power signals; counter means operatively coupled for counting clock signals during the phase lag interval between the power signal and shaft signal for successive periods, thereby providing a measure of the phase lag interval for successive periods; computer means coupled to said gate means, clock means, and counter means, said computer means being programmed for calculating the phase lag interval for successive counter measurements, thereby detecting the load on the load circuit for each cycle, said computer also being programmed for calculating the rate of change of the phase lag interval over successive counter measurements, thereby detecting the rate of change of the load on the load circuit.

* * * * *

UNITED STATES PATENT AND TRADEMARK OFFICE
CERTIFICATE OF CORRECTION

PATENT NO. : 4,399,397
DATED     : August 16, 1983
INVENTOR(S) : Robert S. Kleinschmidt, Jr.

It is certified that error appears in the above-identified patent and that said Letters Patent is hereby corrected as shown below:

Claim 4, line 1, (Column 16, line 46), "claim 4," should read: --claim 3--.

*Signed and Sealed this*

*Eighteenth* Day of *October 1983*

[SEAL]

*Attest:*

GERALD J. MOSSINGHOFF

*Attesting Officer*   *Commissioner of Patents and Trademarks*